Dec. 25, 1951  E. B. KING  2,579,930
TOOL WITH CUSHIONED HAND GRIP
Filed April 11, 1949  2 SHEETS—SHEET 1
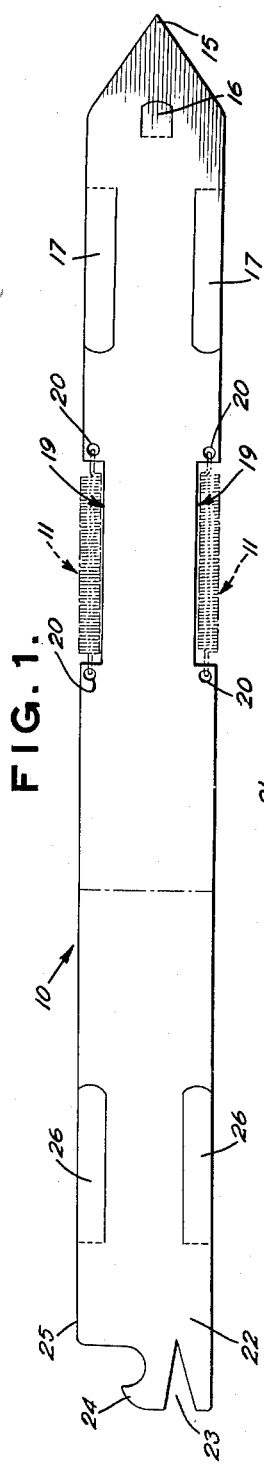
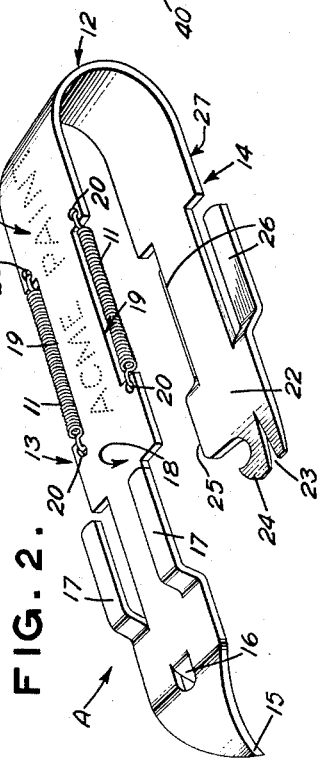
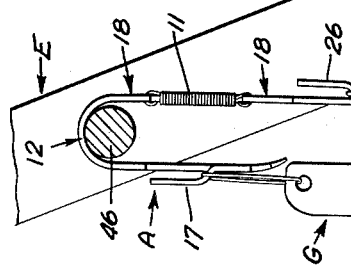
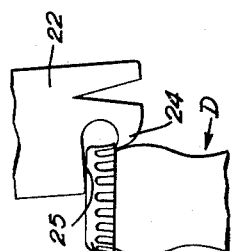
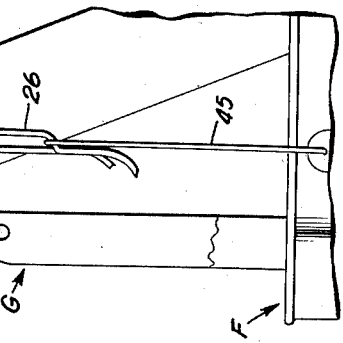
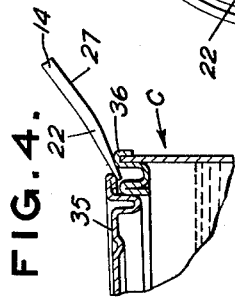
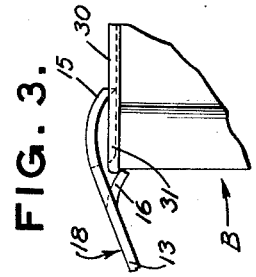
INVENTOR.
Carl B. King
BY Lancaster, Allwin and Rommel
ATTORNEYS.

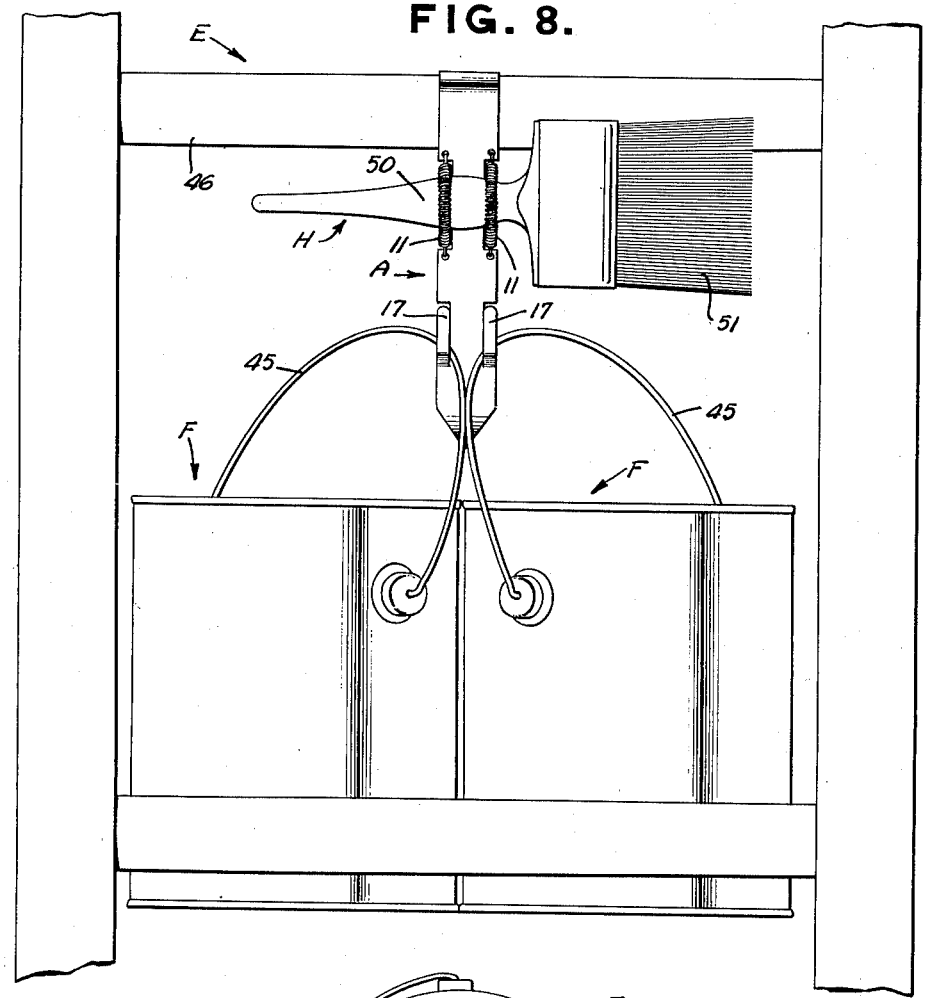
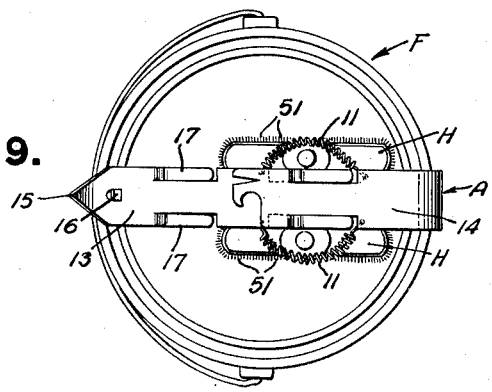

Patented Dec. 25, 1951

2,579,930

UNITED STATES PATENT OFFICE 2,579,930

TOOL WITH CUSHIONED HAND GRIP

Carl B. King, Bluefield, W. Va.

Application April 11, 1949, Serial No. 86,655

4 Claims. (Cl. 7—1)

This invention relates to combination supports and tools, having plural application.

An important object of the invention is to provide such a combination device, which may be disposed in any one of several positions to provide for the support of articles, such as pails and brushes, or may be manipulated as a tool for removing the closures of pails and bottles and the removal of nails, tacks and the like.

Another important object is to provide a device as described which is small in size, yet sturdy, and the greater part of the device comprises a single strip of suitable rigid material, fashioned to shape.

Still another important object is to provide a device as detailed above, which includes novel means to support paint brushes or the like over a container as of paint or oil.

Other objects of the invention include the provisions of means, carried by a device as described, which may be employed as a punch for perforating cans, a crack cleaner, and as an advertising medium.

Still other objects will be apparent during the course of the following detailed description of the invention, taken in connection with the accompanying drawing, forming a part of this application, and in which drawing:

Figure 1 is a plan of the strip of material forming, with two springs shown in dotted lines and after the strip is suitably fashioned to shape, the new combination support and tool.

Figure 2 is a perspective view of the new device.

Figures 3 to 9 inclusive illustrate several applications of the new device.

In the drawing, wherein for the purpose of illustration, is shown a preferred embodiment of the invention and wherein similar reference characters designate corresponding parts throughout the several views, the letter A designates the new combination support and tool; B, one type of container having a sealed closure adapted to be perforated; C, another type of container, having a lift-up closure; D, a bottle having a cap; E, a ladder; F, a pail; G, a tool handle or the like; and H a paint brush.

The new combination support and tool A comprises a relatively narrow strip 10 of suitable material as of steel, bent or otherwise deformed to shape, and a pair of resilient members such as contraction spiral springs 11, with the bent or otherwise deformed strip providing a bight portion 12, a first or preferably longer portion 13 and a second or preferably shorter portion 14.

At the extremity of the portion 13 is an inturned pointed section or bill 15, providing a punch or crack-cleaner, and preferably closely adjacent this section 15 is an inturned lug 16, formed by slitting and upsetting the material of the strip, adapted to be disposed upon a suitable fulcrum so that the remainder of the portion 13 provides an effort arm of a lever, whereby the device may be employed as in Figure 3.

Rearwardly of the lug 16 are a pair of spaced-apart hook sections 17 with their free ends extending toward the bight portion 12 and extending from the outer face 18 of the portion 13. These hook sections 17 are formed by slitting and upsetting the material of the strip 10.

Extending into the opposite outer side edge sections of the portions 13, rearwardly of the hook sections 17, are a pair of elongated recesses 19 which accommodate portions of the springs 11, and their free ends may be accommodated in suitable perforations 20 in the portion 13 adjacent the ends of the recesses.

Between the spaced-apart springs is a space or section 21 for advertising indicia or the like, and, a part of it with the springs 11, form a clip. It will be noted, as in Fig. 6 that the plane of the face 18 intersects the two springs 11.

Referring now to the second or preferably shorter portion 14, the free end section 22 of this portion is provided with means for opening bottles or the like, means to remove tacks, nails and the like and as a pry for closures of pails and similar containers. That is, a part of the section 22 is bifurcated to provide a gradually closing slot 23 opening into the tip of the section 22 and extending longitudinally of the portion 14 and the section 22 has a conventional hook or bill 24 with a lever edge 25 extending therefrom, whereby the device may be employed to remove tacks, nails and the like by slipping the bifurcated ends beneath the head of the nail or tack and around its shank, or the device may be employed as in Figure 5.

Rearwardly of the section 21 are a pair of spaced-apart hook sections 26 with their free ends extending toward the bight portion 12 and extending from the outer face 27 (which merges, at the bight portion, into the outer face 18) of the portion 14. These hook sections 25 are formed as are the hook sections 17.

With reference to Figure 3, the container B, having the sealed closure 30 may have the closure perforated by employing the device as a lever with the free end of the lug 16 in contact with the underside of the bead 31 and an upward pull exerted.

In Figure 4, the crimped-on closure 35 of the container C may be pried off as shown, since the tips of the section 22 may be inserted between the edge portion of the closure 35 and the lip portion 36 of the container and a downward push exerted.

Removal of a cap 40 from a bottle D is effected, as in Figure 5, in the usual manner.

In Figure 6 the device is employed as a so-called pothook to suspend a pail F by its bail 45 carried by the hooks 26 with the bight portion 12 hooked over the rung 46 of the ladder E and another article as the handle G of a tool suspended from the other hooks 17.

In Figure 7 the device A is disposed across the mouth of an open pail F and resting upon the lip thereof. The handle 50 of a brush or the like is slipped under the two springs 11, causing them and a part of the face 18 of the portion 14 to frictionally grip the handle 50, whereby the bristles 51 point downwardly and may contact the paint (or oil) with the free ends of the bristles spaced above the bottom of the pail F. Upon lifting up the device A a slight pull will detach the handle 50 from the grip of the springs 11.

Figure 8 illustrates how the new device A may be employed to support two pails F by their bails 45 from the rung 46 of a ladder E and, if desired, additionally support a paint brush H, for example.

In Figure 9 the device A is disposed differently than shown in Fig. 7, for it is laid across the mouth of the pail F upon its faces other than its edge and, consequently, two brushes may be suspended with their bristles 51 pointing downwardly (as, for example, dipping into the paint or oil in the pail).

The association of the two substantially parallel, spaced-apart portions 13 and 14 provide a good hand grip, much better than either one of the portions 13 or 14 alone, and the springs 11, in effect, provide cushioning means for those portions of the hand at the base of the thumb and index finger, while grasping the device A for using the sections 15 or 22.

Various changes may be made to the form of the invention herein shown and described without departing from the spirit of the invention or scope of the claims.

What is claimed is:

1. In a combination support and tool, a bight portion and two spaced-apart, substantially parallel, narrow, rigid portions extending therefrom, one of said parallel portions having a tool at its free end and one of said parallel portions having a face spaced from said bight portion and a pair of elongated, parallel resilient members extending longitudinally of said portion provided with said face, with said members closely adjacent said face.

2. In a combination support and tool, a bight portion and two spaced-apart, substantially parallel narrow, rigid portions extending therefrom, one of said parallel portions having a tool at its free end and one of said parallel portions having a face spaced from said bight portion and a pair of elongated, parallel resilient members extending longitudinally of said portion provided with said face, with said members closely adjacent said face and the plane of said face intersecting said members.

3. In a combination support and tool, a bight portion and two spaced-apart, substantially parallel, narrow, rigid portions extending therefrom, one of said parallel portions having a tool at its free end and one of said parallel portions having a pair of substantially parallel side edge sections, a face spaced from said bight portion and a pair of elongated, parallel resilient members extending longitudinally of said portion provided with said face at said side edge sections, with said members closely adjacent said face and the plane of said face intersecting said members.

4. In a combination support and tool, a bight portion and two spaced-apart, substantially parallel narrow, rigid portions extending therefrom, one of said parallel portions having a tool at its free end and one of said parallel portions having a pair of side edges with a recess extending into each side edge, and a face spaced from said bight portion and extending to said recesses, and a contraction spiral spring in each recess and secured to said one of said parallel portions.

CARL B. KING.

REFERENCES CITED

The following references are of record in the file of this patent:

UNITED STATES PATENTS

| Number | Name | Date |
| --- | --- | --- |
| 844,868 | Hoffman | Feb. 19, 1907 |
| 1,226,367 | Potenza | May 15, 1917 |
| 1,238,593 | Strait | Aug. 28, 1917 |
| 1,422,308 | Schleicher | July 11, 1922 |
| 2,275,071 | Austin | Mar. 3, 1942 |
| 2,474,167 | Rundell | June 21, 1949 |